United States Patent [19]

Matsuura et al.

[11] 3,917,575

[45] Nov. 4, 1975

[54] PROCESS FOR PRODUCTION OF POLYOLEFINS

[75] Inventors: Kazuo Matsuura, Kawasaki; Nobuyuki Kuroda, Yokohama; Mitsuji Miyoshi, Kanagawa; Masaomi Matsuzaki, Yokohama, all of Japan

[73] Assignee: Nippon Oil Co., Ltd., Tokyo, Japan

[22] Filed: Nov. 7, 1973

[21] Appl. No.: 413,431

[30] Foreign Application Priority Data
Nov. 11, 1972 Japan.............................. 47-113218
Dec. 22, 1972 Japan.............................. 48-000353

[52] U.S. Cl. .... 260/88.2 R; 252/429 B; 252/429 C; 260/93.7; 260/94.9 C; 260/94.9 E
[51] Int. Cl.$^2$...................... C08F 4/50; C08F 10/02
[58] Field of Search.......... 260/88.2, 93.7, 94.9 DA, 260/94.9 E, 94.9 C

[56] References Cited
UNITED STATES PATENTS

| | | | |
|---|---|---|---|
| 2,954,367 | 9/1960 | Vandenberg | 260/94.9 E |
| 3,058,963 | 10/1962 | Vandenberg | 260/94.9 E |
| 3,642,760 | 2/1972 | Baekelmans et al. | 260/94.9 DA |
| 3,801,558 | 4/1974 | Fletcher et al. | 260/94.9 E |

FOREIGN PATENTS OR APPLICATIONS 1,140,649  1/1969  United Kingdom

*Primary Examiner*—Edward J. Smith
*Attorney, Agent, or Firm*—Hill, Gross, Simpson, Van Santen, Steadman, Chiara & Simpson

[57] ABSTRACT

For polymerization or copolymerization of olefins there is used a composite catalyst comprising an organoaluminum compound and the reaction product of an organomagnesium compound and a titanium compound. The reaction between the organomagnesium and titanium compounds is conducted in the presence of an ether compound, with the molar ratio of titanium to magnesium not less than about 3 to 1. These organomagnesium, titanium and ether compounds are selectable from wide ranges of substances specified herein.

10 Claims, No Drawings

PROCESS FOR PRODUCTION OF POLYOLEFINS

BACKGROUND OF THE INVENTION

This invention relates to a process for the production of polyolefins and is more specifically directed to catalysts for use in such process.

Since Ziegler's discovery that catalysts composed of organometallic compounds and transistion metal compounds are well suited for use in the polymerization process of olefins, numerous similar catalysts have been advanced for olefin polymerization. It is now required industrially that the activity of the catalysts for use in the olefin polymerization processes be so high that no extra steps are necessitated for removal of catalyst residues. Apparently, a great majority of the known Ziegler catalysts do not exhibit sufficiently high activity to meet this requirement.

Japanese Patent Publication No. 35-495 and British Pat. No. 1,030,770, for example, disclose composite catalysts such that organoaluminum compounds are used in combination with Ziegler catalysts composed of organomagnesium compounds and transition metal compounds. While these known composite catalysts certain exhibit fairly high activity when used for olefin polymerization, they are still incapable of fulfilling the aforementioned requirement.

According to Belgian Pat. No. 744,470, high catalytic activity in the processes of olefin polymerization is realizable by use of a catalyst resulting from the reaction at relatively low temperatures of titanium tetrachloride and organomagnesium compounds having a relatively long alkyl group with 8 to 12 carbon atoms. However, such organomagnesium compounds having a long alkyl group are usually expensive, and it is not economically advantageous to conduct the reaction between organomagnesium compounds and titanium tetrachloride, which is exothermic, at low temperatures as advanced by the cited Belgian patent. This catalyst is further unsatisfactory in terms of the bulk specific gravity of the resulting polyethylene.

SUMMARY OF THE INVENTION

In view of the noted deficiencies of the prior art, it is an object of this invention to provide a novel and improved process for the production of polyolefins by use of a composite catalyst which exhibits such high activity that the troublesome operation conventionally required for removal of catalyst residues is obviated.

Another object of the invention is to provide a composite catalyst for use in the olefin polymerization process such that, for example, there can be obtained polyethylene of extremely high bulk density.

A feature of the invention resides in the use of a composite catalyst consisting essentially of an organoaluminum compound and the product of reaction between an organomagnesium compound and a titanium compound, the reaction being conducted in the presence of an ether compound at a temperature of at least about 100°C and with the molar ratio of titanium to magnesium at least about 3 to 1.

Another feature of the invention is that the aforesaid organomagnesium compound can be easily prepared by reaction, in the presence of an ether compound, between magnesium and an alkyl, allyl or aryl halide whereby the compound is obtainable in the form of a highly dense solution.

A further feature of the invention is that the organomagnesium compound can be provided in the form of any one of what are herein referred to as Grignard compounds which are complex compounds consisting of specifiable magnesium compounds and specifiable ethers.

A solid catalyst obtained in the form of fine grains as a result of the above mentioned reaction between organomagnesium compound and titanium compound is purple or redish purple in color, as compared with the brown or blackish brown color of the conventional catalysts used for like purposes. While the exact reasons for this are not yet ascertained, it is surmised that the crystal structure of the solid catalyst according to the invention is considerably different from those of the conventional catalysts.

Further according to this invention, the organomagnesium compounds employable for the desired reaction with the titanium compounds may be those having a lower hydrocarbon residue of 1 to 8 carbon atoms or, if required, those having a lower alkyl group of 1 to 4 carbon atoms. The organomagnesium or Grignard compounds having such lower alkyl group are generally very inexpensive and can be prepared highly efficiently. Moreover, according to the invention, the organomagnesium compounds which have been prepared in the presence of ethers or ether compounds can be put to direct use in the reaction with the titanium compounds. This is a great advantage over the mentioned British Pat. No. 1,030,770 and Belgian Pat. No. 744,470 which require that the reaction between organomagnesium compounds and titanium tetrachloride be conducted in the absence of ethers.

It will therefore be understood that highly active catalysts are prepared according to the invention by means which have heretofore been considered disadvantageous and, furthermore, the use of these catalysts results in the production of polyethylene of extremely high bulk density, as hereinafter explained in more detail.

The features which are considered novel and characteristic of this invention are set forth in the appended claims. The invention itself, however, as well as the further objects and advantages thereof, will be best understood from the following detailed description.

DETAILED DESCRIPTION OF THE INVENTION

The organomagnesium compounds for use for the preparation of the solid catalysts according to the invention, which catalysts are put to combined use with organoaluminum compounds in olefin polymerization process, are easily obtainable in the usual manner. For example, magnesium may be caused to react with alkyl, aryl or allyl halide in the presence of an ether compound of 2 to 32 carbon atoms, or with the ether compounds used as a solvent, at a temperature ranging from about 0° to 100°C. The magnesium and the alkyl, aryl or allyl halide in use can be in the molar ratio of approximately 1 to 1, or more desirably the molar quantity of the latter may be slightly in excess of that of the former. The reaction can be expedited by use of an activator such for example as iodine.

According to this invention, the organomagnesium compounds thus formed is subjected to reaction with titanium compounds. The molar ratio of titanium to magnesium used in this reaction is required to be not less than about 3 to 1 or, preferably, to be anywhere between about 5 to 1 and 100 to 1. The reaction can be carried out either by introducing the titanium compound to the organomagnesium compound or vice versa, and at a temperature of at least about 100°C or, preferably, from about 130° to 300°C. The reaction will be further faciliated if the titanium compound is caused to reflux.

In case the reaction between organomagnesium compound and titanium compound is conducted at room temperature, the resulting product will be in the form of solid lumps of varying sizes that are blackish brown in color. No favorable results will be obtainable if this reaction product is used directly as a constituent of the composite catalyst according to the invention. When the product is heated, however, there can be obtained a highly active, purple-colored granular catalyst constituent. It may be noted that even when the reaction is effected at sufficienty elevated temperatures, the product will be in the form of lumps that are not finely dispersible and hence will not be suitable for use as a catalyst in any polymerization process if the molor ratio of titanium to magnesium in use in the reaction is appreciably less that 3 to 1.

While the reaction between organomagnesium compound and titanium compound may be conducted in the presence of no solvent, the use of the same ether compound as that employed for the preparation of the organomagnesium compound is desirable. Upon completion of the reaction any unreacted titanium compound, ether compound and so forth should be removed by distillation or filtration. Alternatively, an inert hydrocarbon such for example as pentane, hexane or heptane may be added to cause sedimentation of suspended matter, and the liquid is succeedingly decanted for removal of the unreacted substances. This proceduure may be repeated several times. In either way the removal of at least the unreacted titanium compound is desirable. The solid catalyst thus prepared in the form of finely divided grains can be put to direct use or, if required, through an additional process of pulverization.

The organomagnesium compounds employable for the preparation of the solid catalyst that is used in combination with an organoaluminum compound for the production of polyolefins according to the invention are defined by the general formula, R'R''Mg, where each of R' and R'' is an alkyl, allyl, aryl or aralkyl group with 1 to 8 carbon atoms, R' and R'' being either identical or different.

Preferably, however, the organomagnesium compounds can be provided in the form of Grignard compounds which within the meaning of this invention are defined by the general formula, $R_1MgX\cdot OR_2R_3$, where X is a halogen atom, and each of $R_1$, $R_2$ and $R_3$ is an alkyl, allyl, aryl or aralkyl group with 1 to 8 carbon atoms, $R_2$ and $R_3$ being either identical or different. The coordination number of the ether with respect to the RMgX is usually 2, although this is subject to change under varying conditions.

It may be noted that by the term "Grignard compounds" as used in this specification and the appended claims are meant all those prepared in the presence of ethers. Typical examples of such Grignard compounds include the complex compounds formed by the union of an ether and any one of such compounds as methyl magnesium chloride, methyl magnesium bromide, methyl magnesium iodide, ethyl magnesium chloride, ethyl magnesium bromide, ethyl magnesium iodide, n-propyl magnesium chloride, n-propyl magnesium bromide, n-propyl magnesium iodide, n-butyl magnesium chloride, n-butyl magnesium bromide, n-butyl magnesium iodide, isobutyl magnesium chloride, isobutyl magnesium bromide, isobutyl magnesium iodide, hexyl magnesium chloride, hexyl magnesium bromide, hexyl magnesium iodide, octyl magnesium chloride, octyl magnesium bromide, phenyl magnesium chloride, and phenyl magnesium bromide.

The ether employable for the formation of such complex compounds has usually 2 to 32 carbon atoms and is selected from the class including dimethyl ether, diethyl ether, diisopropyl ether, dibutyl ether methylethyl ether, diallyl ether, tetrahydrofuran, dioxane, and anisole. These ethers are of course employable as the solvents for the preparation of the organomagnesium compounds.

The titanium compounds used for reaction with the organomagnesium or Grignard compounds under the specified conditions in accordance with the invention are defined by the general formula, $Ti(OR)_nX_{4-n}$, where R is an alkyl, allyl, aryl or aralkyl group, preferably with 1 to 20 carbon atoms, X is a halogen atom, and $n$ is a whole number of from 0 to 4 inclusive. In case $n$ is 0, the formular represents titanium tetrahalides such as titanium tetrachloride and titanium tetraiodide. It is more desirable, however, that $n$ be an integer of from 1 to 4 inclusive, that is, that titanium alkoxide halides be employed as the titanium compounds to be subjected to reaction with the organomagnesium or Grignard compounds. The titanium alkoxide halides can be easily prepared by heating titanium tetrahalide in admixture with alcohols or phenols. There are, for example, titanium monomethoxytrichloride, titanium dimethoxydichloride, titanium trimethoxymonochloride, titanium tetramethoxide, titanium monoethoxytribromide, titanium monoethoxytrichloride, titanium diethoxydichloride, titanium triethoxymonochloride, titanium tetraethoxide, titanium diethoxydibromide, titanium monobutoxytrichloride, titanium dibutoxydichloride, titanium tributoxymonochloride, titanium tetrabutoxide, titanium dibutoxydibromide, titanium monoethoxymonobutoxydichloride, titanium diethoxydibutoxide, titanium monopentoxytrichloride, titanium monophenoxytrichloride titanium diphenoxydichloride, titanium triphenoxymonochloride, titanium tetraphenoxide, titanium diphenoxydibromide, and titanium monoethoxymonophenoxydichloride.

Further according to this invention, the products of reaction between the organomagnesium compounds or Grignard compounds and the titanium compounds are put to combined use with organometallic compounds as a composite catalyst for use in the polymerization or copolymerization of olefins. Usually, the organometallic compounds can be those in Groups I to III of the periodic table that are used as the organometallic compounds constituting Ziegler catalysts. More desirable as such organometallic compounds, however, are the organoaluminum compounds defined by the general formulae:

$R_3Al$, $R_2AlX$, $RAlX_2$, $R_2AlOR$, $RAl(OR)X$, and $R_3Al_2X_3$ where R is the alkyl or aryl group and X is the halogen atom. Typical examples of such organoaluminum compounds include trimethyl aluminium, triethyl aluminum, triisobutyl aluminum, trihexyl aluminum, diethyl aluminum monochloride, ethyl aluminum sesquichloride, and various admixtures of these compounds. These organometallic or organoaluminum compounds are used in amounts from about 0.1 to 1,000 times greater in molar ratio than the aforesaid reaction products of the organomagnesium compounds or Grignard compounds and the titanium compounds.

The production of polyolefins by use of the composite catalyst prepared as hereinbefore described according to the invention can be carried out in substantially the same manner as the well known olefin polymerization process by use of the Ziegler catalysts. More specifically, the polymerization reaction must be conducted in an atmosphere substantially completely devoid of oxygen, water and so forth, or in the state of suspension or solution in a suitable inert solvent. Employable as such solvent or dispersing agent are inert hydrocarbons with a carbon number of from about 3 to 20, such for example as pentane, hexane, heptane, and other n-paraffins. Other conditions for olefin polymerization include a temperature of from about 20° to 300°C, preferably from about 50° to 200°C, and a pressure of from about normal pressure to 100kg/cm², preferably from about 2 to 60kg/cm². The molecular weight of the resulting polymer is regulatable to some extent by changing the polymerization conditions such as temperature and the quantities of the catalysts in use, but more precisely by the addition of a well calculated quantity of hydrogen in the polymerization admixture.

The process of this invention is applicable to the production of all olefins that have been polymerizable conventionally by use of Ziegler catalysts, and more specifically to the polymerization of alpha-olefins such as ethylene, propylene and 1-butene and to the copolymerization of ethylene and propylene, ethylene and 1-butene, and propylene and 1-butene. Most desirably, however, the inventive process may be applied to the production of ethylene copolymers including less than about 10 molar per cent of propylene or butene.

The invention is hereinafter described more specifically in terms of several specific Examples thereof together with Comparative Examples that are given by way of clarification of the advantages of the invention. It is to be understood that all the succeeding Inventive Examples are intended purely to illustrate and explain the invention and not to impose limitations thereon.

INVENTIVE EXAMPLE I

Catalyst Preparation

A 500-milliliter flask equipped with an agitator was filled with 33.3 milliliters (0.1 mole) of the diethyl ether solution (3 mole/liter) of ethyl magnesium bromide, and this solution while being agitated was admixed with 80 milliliters (0.73 mole) of titanium tetrachloride. The molar ratio of titanium to magnesium was thus 7.3 to 1. The reaction first resulted in the production of relatively small, black-colored lumps. This initial reaction product was further subjected to reaction for 3 hours at elevated temperatures and with the titanium tetrachloride in reflux, whereupon the lumps were thoroughly converted into finely divided grains that were purple in color and highly dispersible. The final reaction product was then cooled and was succeedingly admixed with a large quantity of hexane thereby causing sedimentation of the dispersed grains. The entire admixture was further allowed to stand until all the fine grains were settled at the bottom, and the supernatant liquid was then decanted. This procedure of rinsing operation was repeated until all the unreacted titanium tetrachloride was eliminated, and the hexane used as the rinsing liquid was finally removed by distillation to obtain a solid catalyst in the form of purple colored, fine grains.

Polymerization

A nitrogen-purged, stainless steel-made, 2-liter autoclave equipped with agitator was charged with 1,000 milliliters of hexane and then with 10 millimoles of triethyl aluminum and 408 milligrams of the purple colored solid catalyst prepared as above stated. The entire mixture was agitated and heated to a temperature of 90°C. The mixture was subject to a pressure of 2 kilograms per square centimeter due to the vapor pressure of the hexane, and the autoclave was further charged with hydrogen to a total pressure of 6 kilograms per square centimeter and then with ethylene to a total pressure of 10 kilograms per square centimeter to initiate the polymerization reaction. The reaction was caused to proceed for 15 minutes, with continuous introduction of ethylene to maintain the total pressure of 10 kilograms per square centimeter. Upon lapse of the 15-minute period there was obtained a polymeric slurry, which slurry was then charged into a beaker, and the hexane was removed at reduced pressure. Hence, there was obtained 331 grams of polyethylene which was white in color and which had a melt index of 22.3. Catalytic activity was so high that there were produced 6,660 grams of polyethylene per gram of titanium per hour per ethylene pressure and 811 grams of polyethylene per gram of solid catalyst per hour per ethylene pressure. The bulk specific gravity of the polyethylene produced as above was as high as 0.39.

COMPARATIVE EXAMPLE I

The solid catalyst was prepared in exactly the same way as in Inventive Example I except that the reaction between titanium tetrachloride and the diethyl ether solution of ethyl magnesium bromide was conducted at a temperature of 25°C. The resulting catalyst was in the form of a black colored solid consisting mostly of relatively small lumps. This catalyst was employed in combination with triethyl aluminum for production of polyethylene by the process of the preceding Inventive Example. Catalytic activity was so low that there were only 1,130 grams of polyethylene per gram of titanium per hour per ethylene pressure and 126 grams of polyethylene per gram of solid catalyst per hour per ethylene pressure.

COMPARATIVE EXAMPLE II

The solid catalyst was prepared in exactly the same way as in Inventive Example I except that the reaction between titanium tetrachloride and the diethyl ether solution of ethyl magnesium bromide was conducted at a temperature of 25°C and with the molar ratio of titanium to magnesium 1 to 1. The resulting catalyst was in the form of relatively large lumps. Extremely low activity was exhibited when this catalyst was used in combination with triethyl aluminum for production of polyethylene by the process of Inventive Example I.

COMPARATIVE EXAMPLE III

The solid catalyst was again prepared in exactly the same way as in Inventive Example I except that the reaction between titanium tetrachloride and the diethyl ether solution of ethyl magnesium bromide was effected with the molar ratio of titanium to magnesium 2 to 1. The resulting catalyst was in the form of a black colored solid consisting mostly of relatively large lumps. Extremely low activity was exhibited when this catalyst was used in combination with triethyl aluminum for production of polyethylene by the process of Inventive Example I.

INVENTIVE EXAMPLE II

The solid catalyst of Comparative Example III was further admixed with 80 milliliters of titanium tetrachloride, and the reaction was caused to proceed for 5 hours with the titanium tetrachloride refluxed. The black colored lumps were thus gradually caused to sediment in the form of purple colored, fine grains. The polymerization reaction was then conducted in exact accordance with the process of Inventive Examples I except that 216 milligrams of the solid catalyst formed in the form of fine grains as above was employed, and that the reaction was caused to proceed for 20 minutes. There was obtained 256 grams of polyethylene which were white in color and which had a melt index of 19.5. Catalytic activity was remarkable, with yields of 7,220 grams of polyethylene per gram of titanium per hour per ethylene pressure and 890 grams of polyethylene per gram of solid catalyst per hour per ethylene pressure. The bulk specific gravity of the thus-produced polyethylene was also as high as 0.39.

INVENTIVE EXAMPLE III

The solid catalyst was prepared in exact accordance with the process of Inventive Example I except that the diethyl ether solution of ethyl magnesium bromide was replaced by that of n-butyl magnesium chloride. The resulting catalyst was in the form of fine grains that were purple in color. The polymerization reaction was also conducted in conformity with the details set forth in Inventive Example I except that 308 milligrams of the above obtained catalyst was used and that the partial pressure of hydrogen gas was caused to be 2 kilograms per square centimeter and that of ethylene 6 kilograms per square centimeter. The reaction was caused to proceed for 10 minutes, whereupon there was obtained 213 grams of white colored polyethylene with a melt index of 0.3. Catalytic activity was satisfactory, with yields of 4,500 grams of polyethylene per gram of titanium per hour per ethylene pressure and 692 grams of polyethylene per gram or solid catalyst per hour per ethylene pressure.

INVENTIVE EXAMPLE IV

The solid catalyst was again prepared in exact accordance with the process of Inventive Example I except that the diethyl ether solution of ethyl magnesium bromide was replaced by that of n-butyl magnesium chloride and that 160 milliliters (1.46 moles) of titanium tetrachloride was used. The molar ratio of titanium to magnesium was thus 14.6 to 1. The resulting catalyst was in the form of fine grains that were purple in color. The polymerization reaction was conducted in conformity with the process of Inventive Example III except that 241 milligrams of the above prepared catalyst was used. The reaction was caused to proceed for 10 minutes, and 196 grams of white colored polyethylene was obtained. Catalytic activity was such that there were yields of 5,300 grams of polyethylene per gram of titanium per hour per ethylene pressure and 814 grams of polyethylene per gram of solid catalyst per hour per ethylene pressure.

INVENTIVE EXAMPLE V

The solid catalyst was prepared in exact accordance with the process of Inventive Example I except that diethyl ether as the solvent was removed from the diethyl ether solution of ethyl magnesium bromide before this is subjected to reaction with titanium tetrachloride. The polymerization reaction was also conducted in exact accordance with the process of Inventive Example I except that 356 milligrams of the above prepared solid catalyst was used and that the reaction was caused to proceed for 20 4inutes. There was obtained 348 grams of white colored polyethylene with a melt index of 20.0. Catalytic activity was extremely high with yields of 6,150 grams of polyethlene per gram of titanium per hour per ethylene pressure and 735 grams of polyethylene per gram of solid catalyst per hour per ethylene pressure.

INVENTIVE EXAMPLE VI

The solid catalyst was prepared in exact accordance with the process of Inventive Example I except that the titanium tetrachloride was first charged into the flask, followed by the diethyl solution of ethyl magnesium bromide. The polymerization reaction was also conducted in exact accordance with the process of Inventive Example I except that 210 milligrams of the above prepared solid catalyst was used and that the reaction was caused to proceed for 20 minutes. There was obtained 218 grams of white colored polyethylene with a melt index of 21.6. Catalytic activity was extremely high with yields of 6,410 grams of polyethylene per gram of titanium per hour per ethylene pressure and 780 grams of titanium per gram of solid catalyst per hour per ethylene pressure.

INVENTIVE EXAMPLE VII

The solid catalyst was prepared in exact accordance with the process of Inventive Example III except that the diethyl ether solution of butyl magnesium chloride was replaced by that of hexyl magnesium chloride and that 110 milliliters (0.1 mole) of titanium tetrachloride was used. The polymerization reaction was conducted by use of 192 milligrams of the thus-prepared solid catalyst in conformity with the process of Inventive Example III. Upon lapse of 20 minutes there was obtained 270 grams of white colored polyethylene. Catalytic activity was such that there were yields of 4,580 grams of polyethylene per gram of titanium per hour per ethylene pressure and 703 grams of polyethylene per gram of solid catalyst per hour per ethylene pressure.

INVENTIVE EXAMPLE VIII

Copolymerization reaction was conducted by use of the autoclave set forth in Inventive Example I, which autoclave was charged with 153 milligrams of the solid catalyst of Inventive Example I, 10 millimoles of triethyl aluminum, and 1,000 milliliters of hexane. After further introducing hydrogen to a pressure of 1.5 kilograms per square centimeter, a mixed ethylene-propylene gas containing 2 molar per cent of propylene was supplied at a temperature of 80°C. The reaction was caused to proceed for 30 minutes while the pressure of the autoclave was maintained at 7 kilograms per square centimeter. There was resultantly obtained 265 grams of white colored ethylene-propylene copolymer, which

INVENTIVE EXAMPLE IX

Catalyst Preparation

A nitrogen-purged, 500-milliliter flask equipped with an agitator was filled with 94 grams (0.45 mole) of titanium diethyoxydichloride, and 30 milliliters (0.09 mole) of the diethyl ether solution (3 mole/liter) of ethyl magnesium bromide was succeedingly dropped into the flask by means of a tap funnel over a 30-minute period. The molar ratio of titanium to magnesium was thus 5 to 1. There were first produced relatively small, black colored lumps, and the reaction was caused to proceed another 3 hours at a temperature of 130°C, whereupon the lumps were thoroughly converted into fine grains that were purple in color and highly dispersible. This final reaction product was succeedingly admixed with a large quantity of hexane thereby causing sedimentation of the dispersed grains, and the liquid was then decanted. The decantation process was repeated until all the unreacted titanium compound was eliminated, and the hexane used as the rinsing liquid was finally removed by distillation to obtain a solid catalyst in the form of purple colored, fine grains.

Polymerization

A nitrogen-purged, stainless steel-made, 2-liter autoclave equipped with an agitator was charged with 1,000 milliliters of hexane and then with 5 millimoles of triethyl aluminum and 146 milligrams of the purple colored solid catalyst prepared as in the foregoing. The entire mixture was agitated and heated to a temperature of 90°C. The mixture was subject to a pressure of 2 kilograms per square centimeter due to the vapor pressure of the hexane in use, and the autoclave was further charged with hydrogen to a total pressure of 4.4 kilograms per square centimeter and then with ethylene to a total pressure of 10 kilograms per square centimeter to initiate the polymerization reaction. The reaction was caused to proceed for 10 minutes, with continuous introduction of ethylene to maintain the total pressure of 10 kilograms per square centimeter. Upon lapse of the 10-minute period there was obtained a polymeric slurry, which slurry was then charged into a beaker, and the hexane was removed at reduced pressure. Hence, 198 grams of polyethylene was obtained which was white in color and which had a melt index of 0.21. Catalytic activity was extremely high with yields of 11,500 grams of polyethylene per gram of titanium per hour per ethylene pressure and 1,451 grams of polyethylene per gram of solid catalyst per hour per ethylene pressure.

COMPARATIVE EXAMPLE IV

The solid catalyst was prepared in exactly the same way as in Inventive Example IX except that the reaction between titanium diethoxydichloride and the diethyl ether solution of ethyl magnesium bromide was conducted at a temperature of 25°C. The resulting catalyst was in the form of a black colored solid consisting mostly of relatively small lumps and was thus noticeably different from that prepared in Inventive Example IX. The polymerization reaction was also conducted in exact accordance with the process of Inventive Example IX except that 250 milligrams of the black colored solid catalyst was used and that the reaction was caused to proceed for 30 minutes. Catalytic activity was undoubtedly inferior, with yields of only 900 grams of polyethylene per gram of titanium per hour per ethylene pressure and 102 grams of polyethylene per gram of solid catalyst per hour per ethylene pressure.

COMPARATIVE EXAMPLE V

The solid catalyst was prepared in exact accordance with the process of Inventive Example IX except that the reaction between titanium diethoxydichloride and the diethyl ether solution of ethyl magnesium bromide was carried out with the molar ratio of titanium to magnesium 2 to 1. The resulting catalyst was mostly in the form of black colored, relatively small lumps. Extremely low activity was exhibited when this catalyst was employed for polyethylene production in substantial accordance with the process of Inventive Example IX.

INVENTIVE EXAMPLE X

The solid catalyst was prepared in exact accordance with the process of Inventive Example IX except that 137 grams (0.45 mole) of titanium diphenoxydichloride was used instead of 94 grams (0.45 mole) of titanium diethoxydichloride. The polymerization reaction was also conducted in exact accordance with the process of Inventive Example IX except that 71 milligrams of the thus prepared catalyst was used. There was resultantly obtained 124 grams of white colored polyethylene with a melt index of 0.19. Catalytic activity was remarkably high with yields of 15,400 grams of polyethylene per gram of titanium per hour per ethylene pressure and 1,870 grams of polyethylene per gram of solid catalyst per hour per ethylene pressure.

INVENTIVE EXAMPLE XI

The solid catalyst was prepared in exact accordance with the process of Inventive Example IX except that 204 grams (0.9 mole) of titanium n-butoxytrichloride was used instead of 94 grams (0.45 mole) of titanium diethoxydichloride. The polymerization reaction was also conducted in exact accordance with the process of Inventive Example IX except that 143 milligrams of the resulting catalyst was used. There was thus obtained 166 grams of white colored polyethylene with a melt index of 0.09. Catalytic activity was extremely high with yields of 10,500 grams of polyethylene per gram of titanium per hour per ethylene pressure and 1,240 grams of polyethylene per gram of solid catalyst per hour per ethylene pressure.

INVENTIVE EXAMPLE XII

The solid catalyst was prepared in exact accordance with the process of Inventive Example IX except that ethyl magnesium bromide was replaced by butyl magnesium chloride. The polymerization reaction was also conducted in exact accordance with the process of Inventive Example IX except that 156 milligrams of the thus prepared catalyst was used. There was resultantly obtained 197 grams of white colored polyethylene with a melt index of 0.14. Catalytic activity was high with yields of 9,500 grams of polyethylene per gram of titanium per hour per ethylene pressure and 1,350 grams of polyethylene per gram of solid catalyst per hour per ethylene pressure.

INVENTIVE EXAMPLE XIII

Copolymerization reaction was conducted by use of the autoclave set forth in Inventive Example IX, which autoclave was with charged 96 milligrams of the solid catalyst of Inventive Example IX, 5 millimoles of triethyl aluminum, and 1,000 milliliters of hexane. Hydrogen was further introduced into the autoclave to a pressure of 1.5 kilograms per square centimeter, and then a mixed ethylene-propylene gas containing 2 molar percent of propylene was supplied at a temperature of 80°C. The copolymerization reaction was caused to proceed for 15 minutes while the autoclave pressure was maintained at 7 kilograms per square centimeter. As a result there was obtained 120 grams of white colored ethylene-propylene copoler, which was succeedingly confirmed to be as such by infrared spectrum techniques. Catalytic activity was satisfactory with yields of 7,650 grams of copolymer per gram of titanium per hour per ethylene pressure and 890 grams of copolymer per gram of solid catalyst per hour per ethylene pressure.

While the invention has been described hereinbefore in very specific aspects thereof, many modifications or changes will readily be contemplated by the specialists, without necessarily departing from the spirit and scope of the invention as sought to be defined by the following claims.

What is claimed is:

1. A process for the production of polyolefins which comprises polymerizing or copolymerizing olefins in the presence of a composite catalyst consisting essentially of:
   a product of reaction between an ether solution of an organomagnesium compound and a titanium compound, said ether being the sole solvent in the reaction system, at a temperature of at least about 100°C, with the molar ratio of titanium to magnesium at least about 3 to 1, said titanium compound being defined by the general formula, $Ti(OR)_n X_{4-N}$, wherein R is selected from the class consisting of alkyl, allyl, aryl and aralkyl groups, wherein X is a halogen, and wherein $n$ is a whole number of from 0 to 4 inclusive; and
   an organoaluminum compound.

2. A process as defined in claim 1, wherein said organomagnesium compound is selected from Grignard compounds which are defined by the general formula, $R_1 MgX \cdot OR_2 R_3$, wherein X is a halogen, and wherein each of $R_1$, $R_2$ and $R_3$ is selected from the class consisting of alkyl, allyl, aryl and aralkyl groups of 1 to 8 carbon atoms.

3. A process as defined in claim 2, wherein $R_2$ and $R_3$ are identical.

4. A process as defined in claim 3, wherein said Grignard compounds include the complex compounds formed by the union of an ether of 2 to 32 carbon atoms with one of the following methyl magnesium chloride, methyl magnesium bromide, methyl magnesium iodide, n-propyl magnesium chloride, n-propyl magnesium bromide, n-propyl magnesium iodide, n-butyl magnesium chloride, n-butyl magnesium bromide, n-butyl magnesium iodide, isobutyl magnesium chloride, isobutyl magnesuim bromide, isobutyl magnesium iodide, hexyl magnesium chloride, hexyl magnesium bromide, hexyl magnesium iodide, octyl magnesium chloride, octyl magnesium bromide, phenyl magnesium chloride, and phenyl magnesium bromide.

5. A process as defined in claim 4, wherein said ether is selected from the class consisting of dimethyl ether, diethyl ether, diisopropyl ether, dibutyl ether, methylethyl ether, diallyl ether, tetrahydrofuran, dioxane, and anisole.

6. A process as defined in claim 1, wherein said titanium compound is titanium tetrachloride or titanium tetraiodide.

7. A process as defined in claim 1, wherein said titanium compound is selected from the class consisting of titanium monomethyoxytrichloride, titanium dimethoxydichloride, titanium trimethyoxymonochloride, titanium tetramethoxide, titanium monoethyoxytribromide, titanium monoethyoxytrichloride, titanium diethoxydichloride, titanium triethoxymonochloride titanium tetraethoxide, titanium diethoxydibromide, titanium monobutoxytrichloride, titanium dibutoxydichloride, tianium tributoxymonochloride, titanium tetrabutoxide, titanium dibutoxydibromide, titanium monoethoxymonobutoxydichloride, titanium diethoxydibutoxide, titanium monopentoxytrichloride, titanium monophenoxytrichloride, titanium diphenoxydichloride, titanium triphenoxymonochloride, titanium tetraphenoxide, titanium diphenoxydibromide, and titanium monoethyoxymonophenoxydichloride.

8. A process as defined in claim 1, wherein said organoaluminum compound is selected from the class consisting of trimethyl aluminum, triethyl aluminum, triisobutyl aluuminum, trihexyl aluminum, diethyl aluminum monochloride, ethyl aluminum sesquichloride, and admixtures of the listed compounds.

9. A process as defined in claim 8, wherein said organoaluminum compound is used in amounts of from about 0.1 to 1,000 times greater in molar ratio than the product of reaction between the organomagnesium compound and the titanium compound.

10. A process as defined in claim 1, wherein said process is adaptable specifcally for the production of a copolymer of ethylene and another olefin selected from the class consisting of propylene and 1-butene, said other olefin being contained in said copolymer in an amount of not more than about 10 molar percent.

* * * * *